(12) United States Patent
Uchida

(10) Patent No.: US 6,343,161 B2
(45) Date of Patent: *Jan. 29, 2002

(54) IMAGE PROCESSING DEVICE

(75) Inventor: Mitsuaki Uchida, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/736,201

(22) Filed: Dec. 15, 2000

Related U.S. Application Data

(63) Continuation of application No. 09/115,758, filed on Jul. 15, 1998.

(30) Foreign Application Priority Data

Jul. 15, 1997 (JP) .............................................. 9-190025
Jul. 15, 1997 (JP) .............................................. 9-190027

(51) Int. Cl.$^7$ ................................................. G06K 9/03
(52) U.S. Cl. ...................... 382/309; 382/304; 382/307; 714/7; 714/11; 714/13; 714/30; 714/720
(58) Field of Search ................................ 382/304, 309; 702/58, 85; 711/148, 171; 714/5, 7, 29, 30, 42, 824, 6, 3, 11, 13, 28, 820, 8, 719, 720; 703/14, 16, 23; 348/180, 181; 358/504, 406; 386/21; 399/83, 86

(56) References Cited

U.S. PATENT DOCUMENTS 4,293,950 A * 10/1981 Shimizu et al. ................ 371/21
4,891,810 A * 1/1990 De Corlieu et al. ........... 371/91
4,943,966 A * 7/1990 Giunta et al. ............... 371/11.1
4,970,644 A * 11/1990 Berneking et al. ........... 364/422
5,016,107 A * 5/1991 Sasson et al. ................ 358/209
5,021,978 A * 6/1991 Stone et al. ................. 364/525
5,175,633 A * 12/1992 Saito et al. .................. 358/406
5,337,319 A * 8/1994 Furukawa et al. .......... 371/11.1
5,357,621 A * 10/1994 Cox ............................ 395/400
5,394,486 A * 2/1995 Eisenbarth et al. ............ 382/57
5,703,628 A * 12/1997 Nishiyama ................... 345/202
5,859,961 A * 1/1999 Probsting ................ 395/182.06
5,881,221 A * 3/1999 Hoang et al. ........... 395/183.18
5,987,230 A * 11/1999 Shimizu ..................... 395/115

* cited by examiner

*Primary Examiner*—Leo Boudreau
*Assistant Examiner*—Brian P. Werner

(57) ABSTRACT

Image data of a test pattern is transmitted to an image processor and image processing is effected by the image processor based on the test pattern. The image outputted (the results of the image processing) from this test pattern image processing and the original image are compared to each other. If they are different, the image processing by the current image processor is judged to be abnormal. In this case, the image processor (hardware process) is switched promptly and automatically to be emulated by an auto set-up engine (software process). Further, in the image processor section, ordinarily, three frame memories are used to effect processes including reading of image data, image processing, and outputting of image data at the same time and in parallel. Image processing can be switched in such a manner that when any one of the frame memories is judged to be abnormal, the two remaining frame memories judged as normal are used to execute image processing.

3 Claims, 10 Drawing Sheets

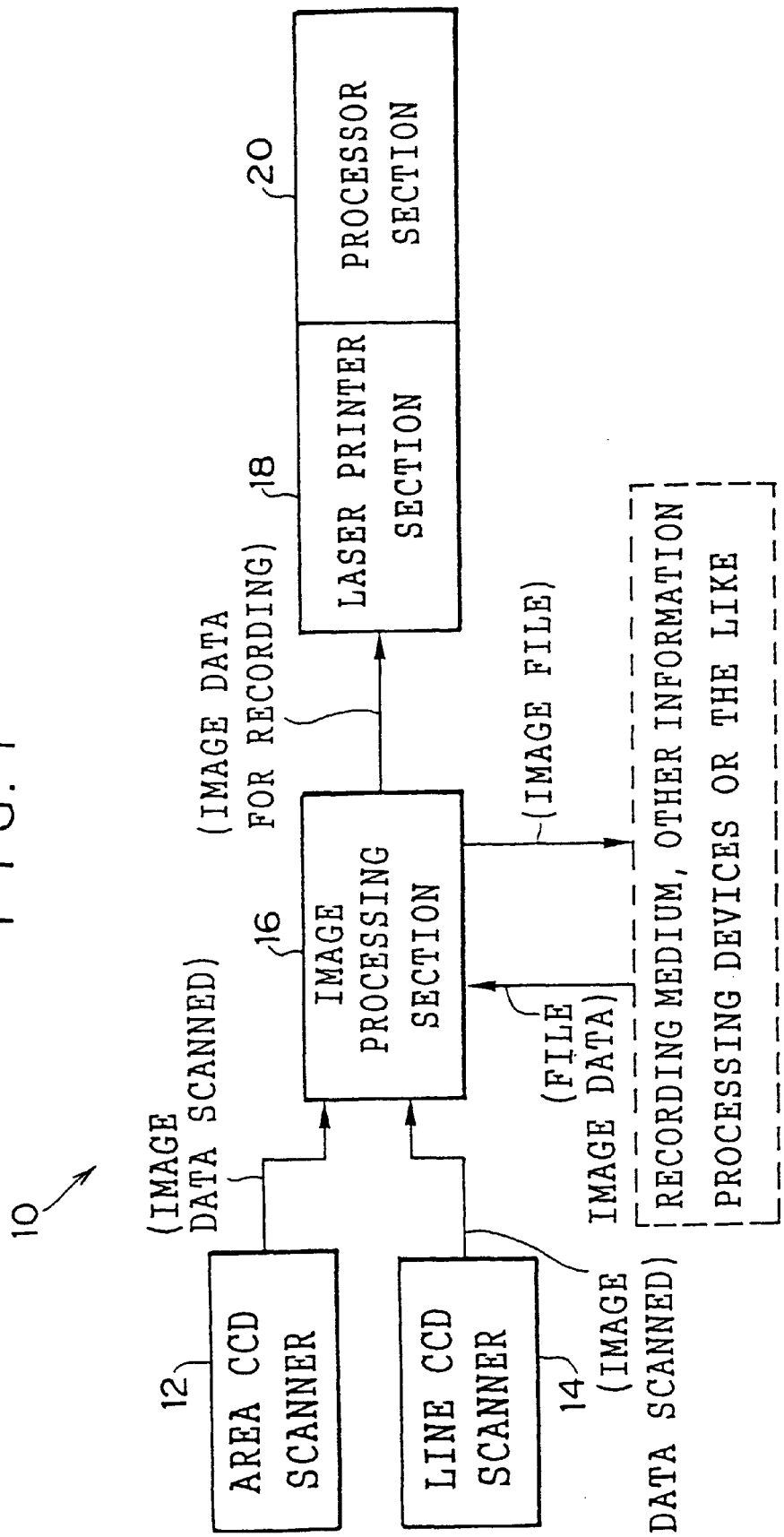
F I G. 1

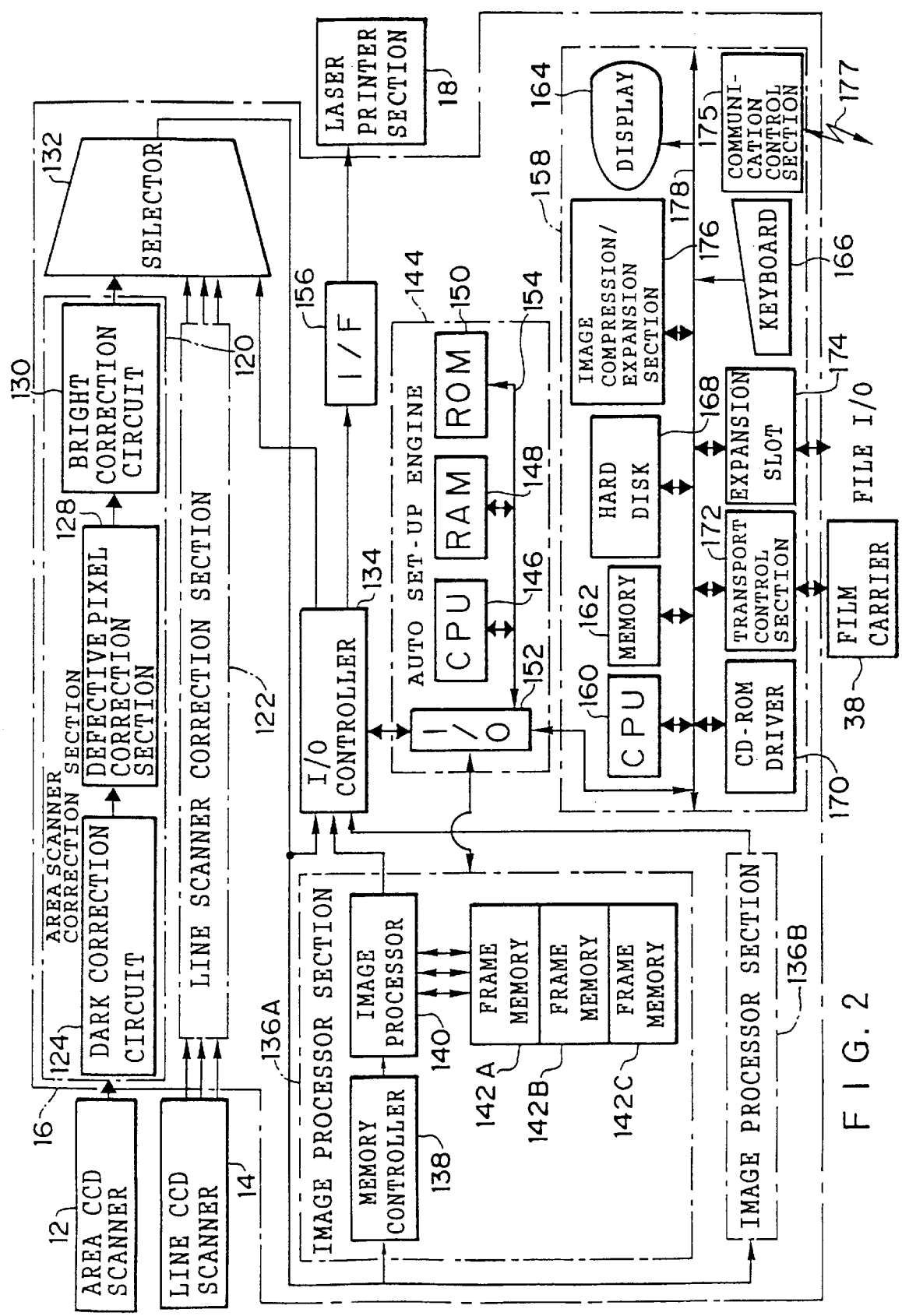
F I G. 2

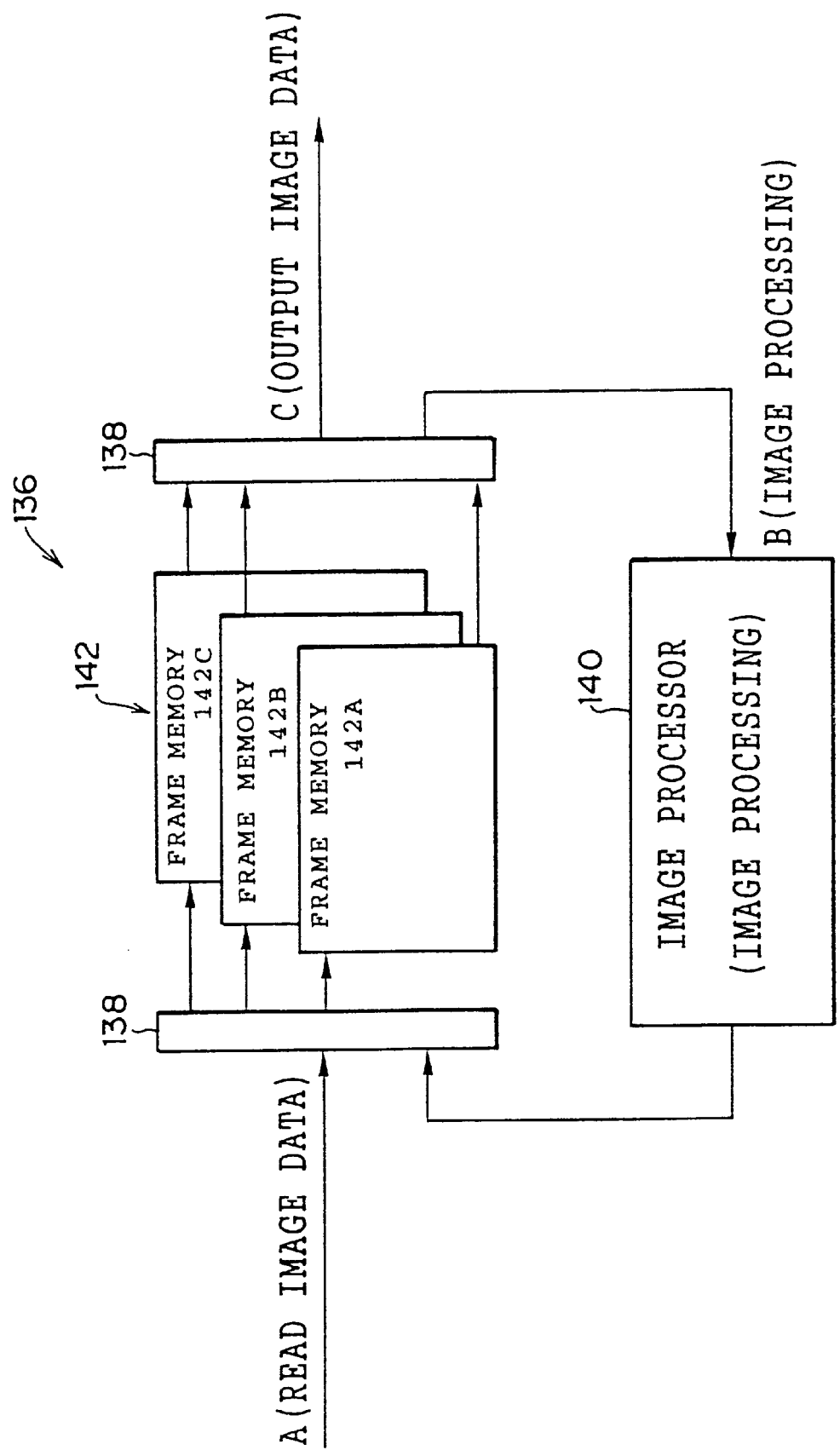

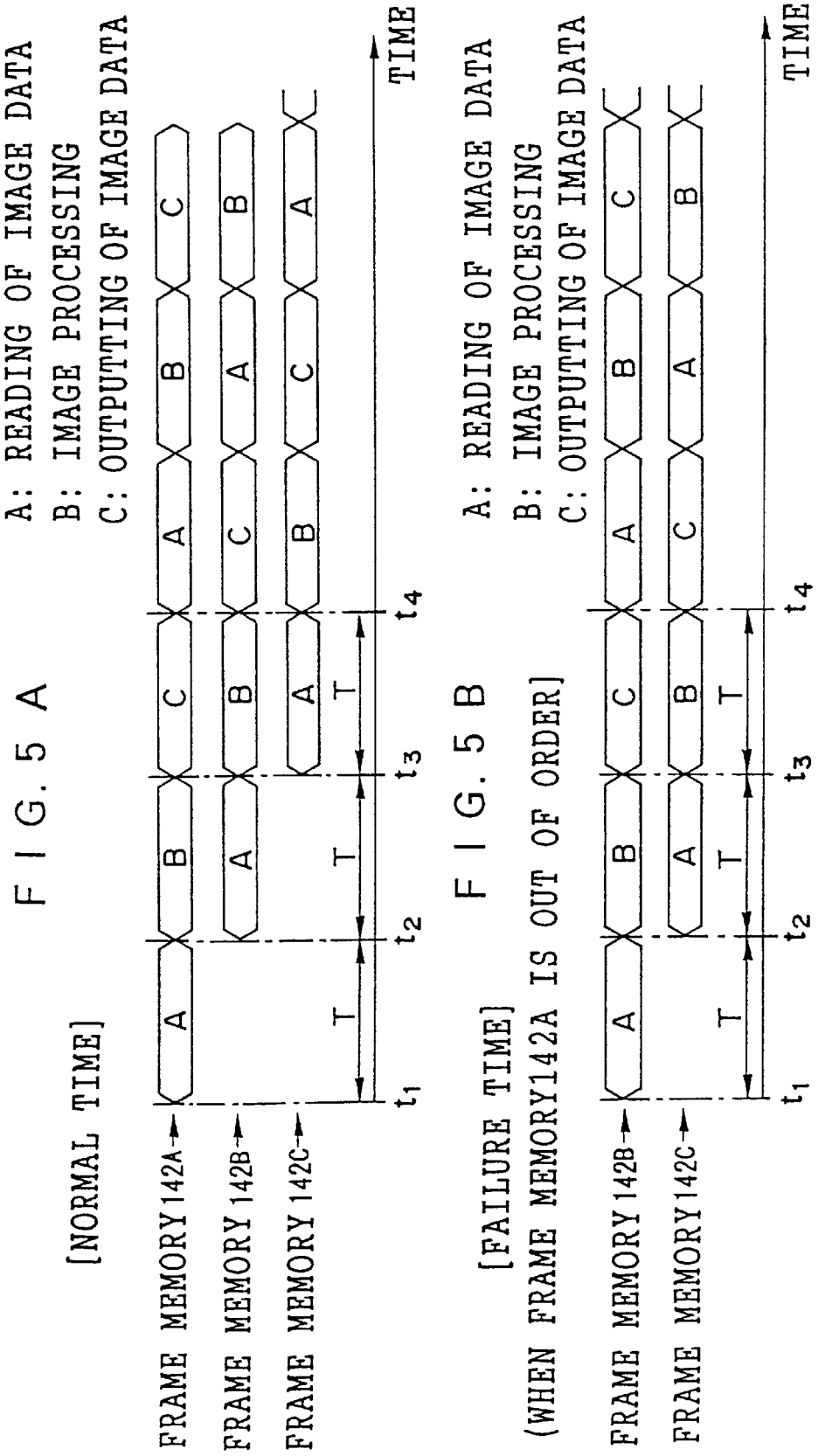

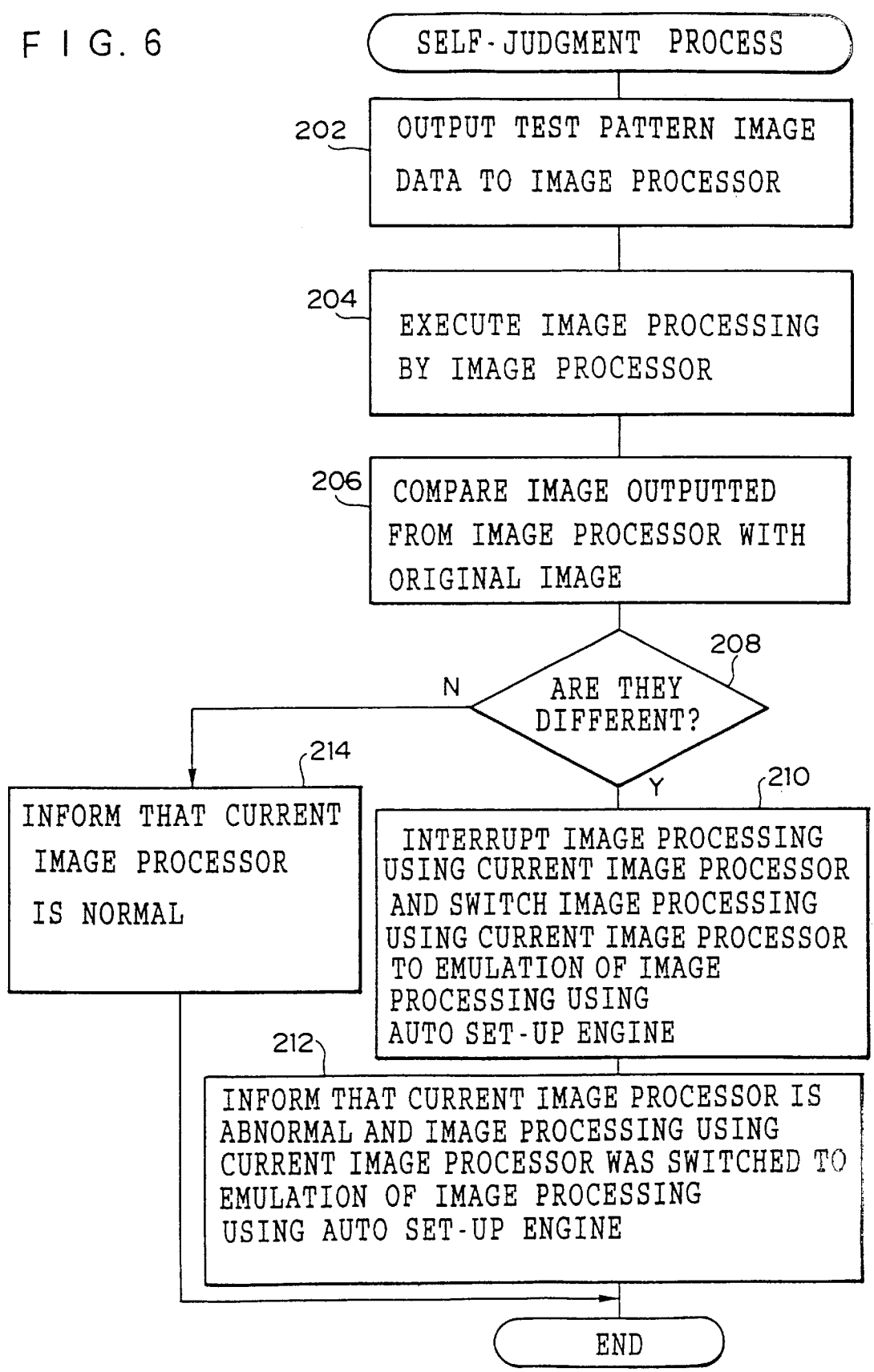

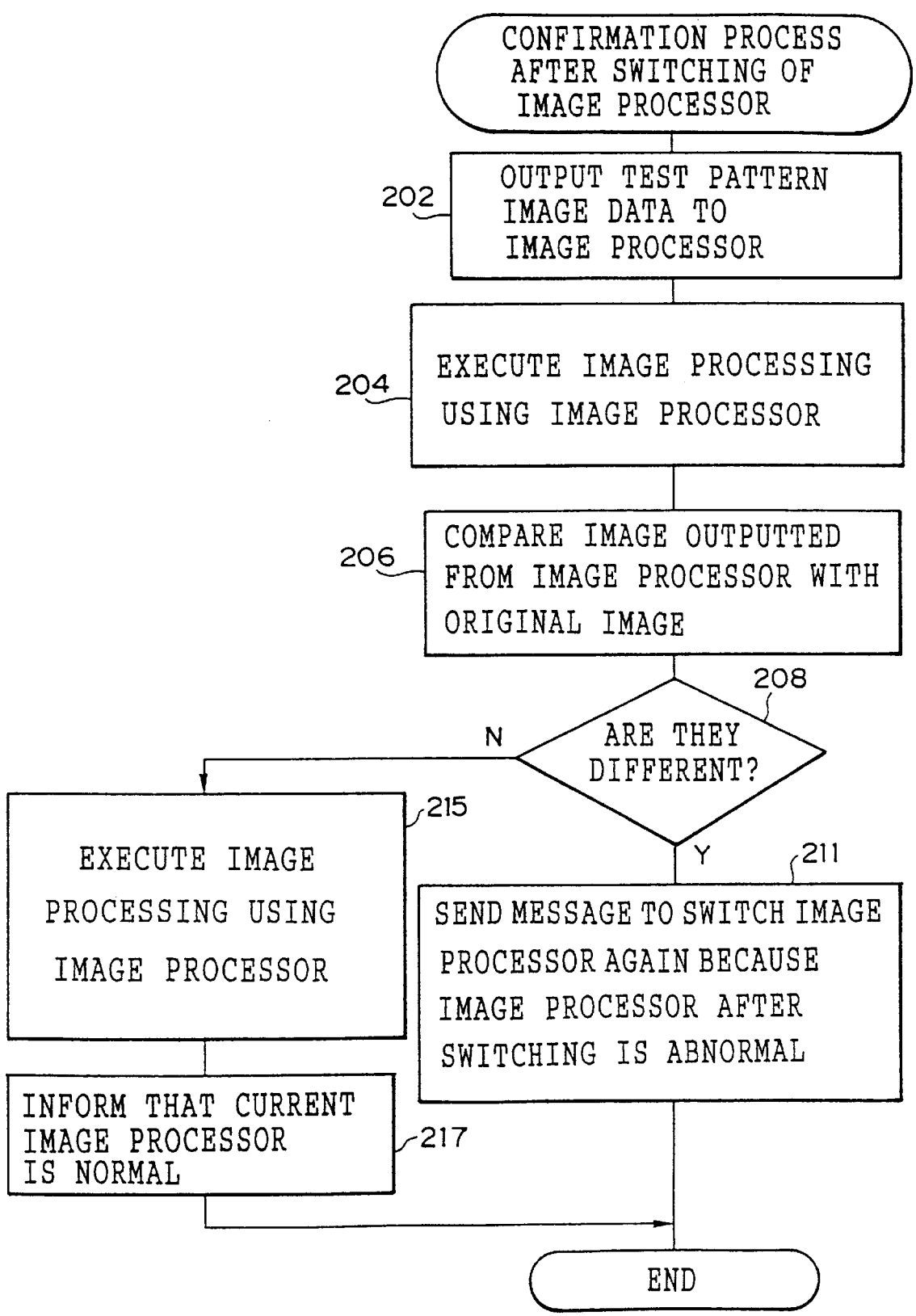

IMAGE PROCESSING DEVICE

This application is a continuation of co-pending application Ser. No. 09/115,758, filed on Jul. 15, 1998, the entire contents of which are hereby incorporated by reference.

BACKGROUND OF THE INVENTION

1. Field of the Invention

The present invention relates to an image processing device, and more particularly to an image processing device in which image processing is executed for image data read from a film image or the like, and image data inputted from external devices such as a personal computer (PC) and the like, and executed for which outputs the results of the image processing.

2. Description of the Related Art

Conventional image processing devices are known where a film image recorded on a photographic film is read by an image reading device having a reading sensor such as a CCD (charge coupled device). Image processing including expansion and/or compression, and various types of correction are effected on the basis of the image data provided by reading a film image or the like. Additionally, image data inputted from external devices such as a personal computer, for example, is recorded on recording materials or displayed on a display screen.

An image processor is mounted on such a conventional image processing device as hard ware (an image processing board) which is used exclusively for carrying out the predetermined image processing described above. By this image processor, image processing has been effected at a high processing rate on the basis of image data which is read by a scanner, for example, or image data inputted from the external PC.

However, when the above-described image processor (made of hardware) is used for a long period of time, the components comprising the processor can deteriorate. Accordingly, sooner or later, the image processor may fail.

Because the image processor is not an expendable product but an expensive member, when it is out of order, it often takes time to supply and replace another image processor for the broken image processor. For this reason, when the image processor is broken, the image processing device cannot be used for a long period of time.

Therefore, one method is to replace the broken image processor with other image processors through other image processors through installing a plurality of image processors in the image processing device. However, with this method, as described above, because image processors are expensive, a problem arises in that manufacturing costs for the image processing device become extremely high.

For this reason, what is needed is, an alternative means which can replace an out of order image processor so as to continue uninterrupted image processing.

Further, image processing using the conventional image processing device as described above is effected with higher processing rate for a large amount of image data. Indeed, various types of image processing devices having a plurality of frame memories for storing image data are provided, and three processes including reading of image data, image processing, and outputting of image data are effected concurrently by using the plurality of provided frame memories.

However, a technical problem may arise in that, although image processing can be effected with a high processing rate, when one of a plurality of the memories is out of order, the aforementioned three processes cannot be concurrently processed such that image processing is thereby interrupted.

SUMMARY OF THE INVENTION

In order to solve the above-described problems, it is an object of the present invention to provide an image processing device in which image processing can be continued even when an image processor is out of order. It is another object of the present invention to provide an image processing device in which image processing can be continued even when one of a plurality of memories is out of order.

In order to accomplish the first object, a first aspect of the present invention is an image processing device comprising: an image processor which executes a predetermined image processing for image data; executing means for executing, by software, the same image processing as the image processing executed by the image processor; judging means for judging whether the image processing executed by the image processor is normal; and switching control means for, when image processing executed by the image processor is judged to be abnormal by the judging means, switching to the executing means so that the executing means executes, by software, the same image processing as the image processing executed by the image processor.

A second aspect of the present invention is an image processing device according to the first aspect, wherein the judging means judges whether the image processing executed by the image processor is normal by comparing an outputted image obtained by the image processor executing the image processing and an outputted image obtained by the image processor executing normal image processing.

In the image processing device according to the first aspect of the present invention, a predetermined image processing is executed on the basis of image data (for example, image data obtained by reading the image by a scanner or the like or image data inputted from external devices). Because an image processor is manufactured exclusively for a predetermined image processing, the image processing using the image processor can be effected at a high processing rate.

Further, the image processing device according to the first aspect of the present invention, comprises: executing means in which the same image processing which has been effected by the image processor is effected through a software (namely, image processing is emulated); and judging means which judges whether the image processing through the image processor is normal.

The judging means judges whether the image processing using the current image processor is normal. In the same manner as the second aspect of the present invention, the judging means executes an image processing using the image processor on the basis of the original image data, and compares an outputted image obtained by the image processor executing image processing and an outputted image obtained by the image processor executing normal image processing. When they correspond to each other, the judging means judges that the image processing by the image processor is normal. When they do not correspond to each other, the judging means judges that the image processing by the current image processor is abnormal.

Moreover, it is desired that the above-described judging using the judging means is effected periodically (for example, at the start-up time every morning) and/or immediately (i.e. when the operator instructs the image processing device to implement this judging means).

When the image processing executed by the image processor is judged to be abnormal by the judging means, switching control means switches to the executing means so that the executing means executes, through software, the same image processing as the image processing executed by the current image processor. However, in this case, because image processing is merely emulated by the executing means, the processing rate of image processing using software is lower than the processing rate at which the image processing is executed by the image processor is used exclusively for image processing.

As described above, when the image processor is out of order, the switching control means switches to the executing means so that the executing means executes, by software, the same image processing as the image processing executed by the image processor, image processing can be continued without being disabled (interrupted) until another image processor is prepared.

In order to accomplish the second object of the present invention, a third aspect of the present invention is an image processing device, comprising: a plurality of memories; judging means which judges whether each of the memories is normal; and processing executing means for, in a case in which the judging means judges all of the memories to be normal, executing image processing by using all of the memories, and in a case in which the judging means judges at least one of the memories to be abnormal, executing processing by using the memory judged to be normal.

The image processing device according to the fourth aspect of the present invention, comprises three memories; judging means which judges whether each of the memories is normal; and control means for executing processing when all of the three memories is judged to be normal by the judging means, the three memories are used to concurrently and repeatedly execute three processes which are a reading process for reading image data, image processing for the read image data, and an outputting process for outputting image data for which image processing has been completed, and when one of the three memories is judged to be abnormal by the judging means, two memories which are judged to be normal are used to repeatedly execute the three processes while executing two out of the three processes concurrently.

The image processing device according to the third aspect of the present invention comprises: judging means which judges whether each of the memories is normal. When all of the memories are judged to be normal by the judging means, all of the memories are used to effect image processing by the processing means.

Meanwhile, when at least one of the memories is out of order and it is judged to be abnormal by the judging means, the processing executing means implements further image processing without being interrupted by using the memories which are judged to be normal. For example, if the image processing device has three memories or more, when one of the memories has already been out of order, while another one is newly out of order, the control means implements further image processing by using the one remaining memory alone and without the aforementioned memories which are judged to be abnormal.

Accordingly, even when one or more of a plurality of memories is out of order, the current image processing can be continued without being interrupted.

In the image processing device according to the fourth aspect of the present invention, when all three memories are normal, the control means effects three processes by using all three memories. The three processes include the image reading process for reading image data, the image processing for the image data read, and the outputting process for outputting image data for which image processing has been completed. In this way, when all of the three memories are used for image processing, the processing rate is three times higher than when one memory is used.

When one of the three memories is out of order, it is judged to be abnormal by the judging means. In the control means, two memories which are judged to be normal are used to effect two processes out of the three processes concurrently, while the three processes are being implemented repeatedly.

Even when one of the memories is out of order, image processing can be continued without being disabled. In this case, although processing efficiency may drop, image processing can be effected with twice the efficiency of just one memory.

It is preferred that the above-described judging by the judging means is executed periodically, and at the moment when the operator instructs the image processing device to execute the judgment.

Methods in which memory failure and processable image sizes are reported to the operator or the service man can be effected by displaying messages or image size information on a computer screen, by a spoken message from a speaker or the like, or by writing in a printing paper a message or image size information. Further, it is very effective to send a message about memory failure by e-mail to a service man.

BRIEF DESCRIPTION OF THE DRAWINGS

FIG. 1 is a schematic block diagram illustrating a digital lab system according to an embodiment of the present invention.

FIG. 2 is a schematic structural block diagram illustrating an image processing section.

FIG. 4 is a view which explains three steps for carrying out image processing at an image processor section.

FIG. 5A is a view which illustrates time changes for the steps which are executed by using each frame memory when all of the frame memories are normal (at an ordinary time).

FIG. 5B is a view which illustrates time changes for the steps which are executed by using frame memories 142B and 142C when a frame memory 142A is out of order.

FIG. 6 is a flow chart which illustrates a control routine of a self-judgment process.

FIG. 7 is a flow chart which illustrates a control routine of a confirmation process after switching of the image processor.

DESCRIPTION OF THE PREFERRED EMBODIMENTS

Figure 3:
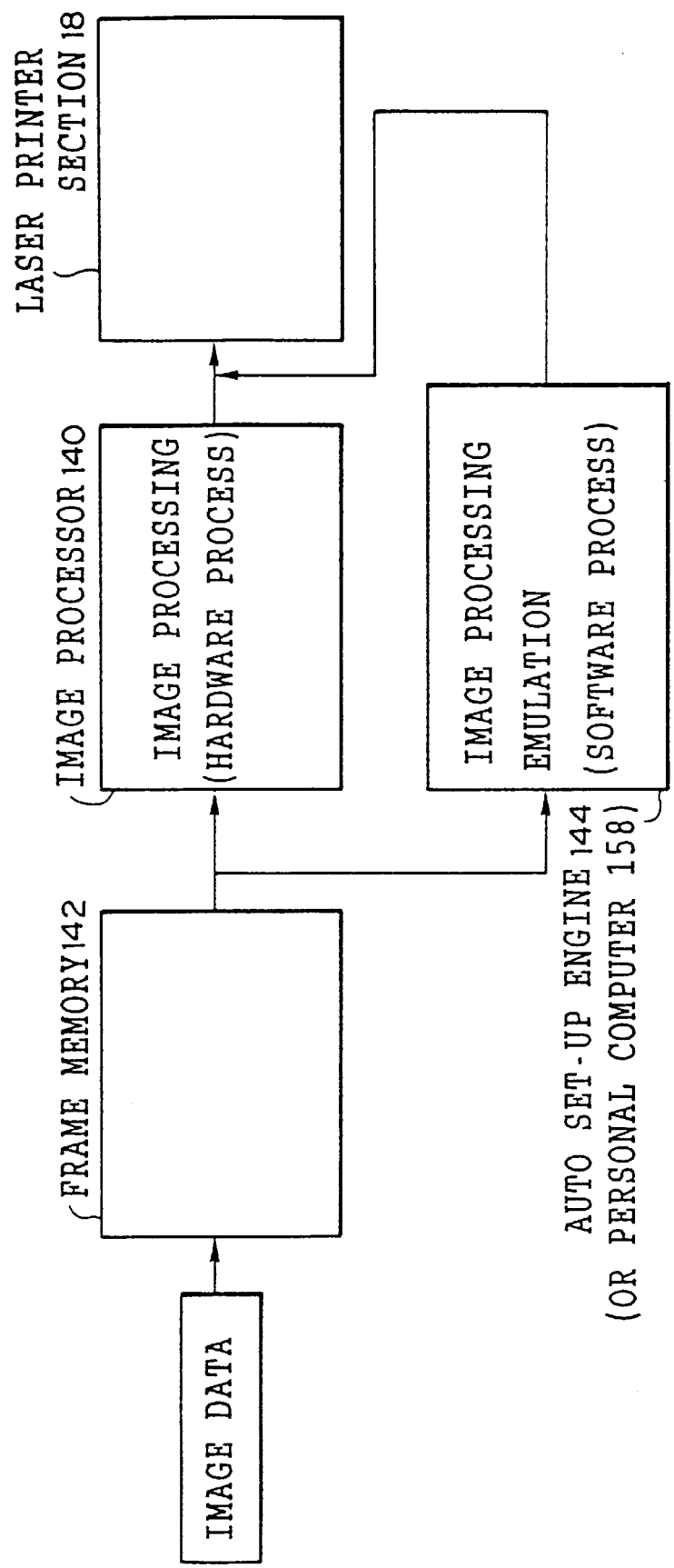
FIG. 3 is a view which explains a switching function in an image process at the image processing section.

A detailed description of an embodiment of the present invention will be given hereinafter with reference to the drawings. Further, hereinafter, the present invention will be explained by using values which cause no damage to the present invention. However, the present invention is not limited to the values which will be described below. Moreover, a description of a digital lab system according to the present invention will be given hereinafter. The digital lab system is used at a relatively small size lab, i.e., a so-called mini lab.

A digital lab system 10 according to the present embodiment is shown in FIG. 1. The lab system 10 is comprised of an input section which has an area CCD scanner 12, a line CCD scanner 14, and an image processing section 16, and an output section which has a laser printer section 18 and a processor section 20.

The area CCD scanner 12 and the line CCD scanner 14 are used to read film images recorded on a photographic film such as a negative film, a reversal film or the like. For example, the area CCD scanner 12 can read film images formed on a 135 size-photographic film, a 110 size-photographic film, and a photographic film having a transparent magnetic layer formed thereon (a 240 size-photographic film: a so-called APS film). The line CCD scanner 14 can read film images which are formed on a 120 size-photographic film and a 220 size-photographic film (both films are Brownie size).

The area CCD scanner 12 and the line CCD scanner 14 read the aforementioned film images by an area CCD and a line CCD, and output image data. Further, the digital lab system 10 does not have to comprise both the area CCD scanner 12 and the line CCD scanner 14. For example, when the size of the photographic film whose film images are supposed to be read is limited, either the area CCD scanner 12 or the line CCD scanner 14 (e.g., the area CCD scanner 12) can be provided at the digital lab system 10. Further, instead of the area CCD scanner 12 and the line CCD scanner 14, a scanner which can read all film images on photographic films formed of all sizes (preferably, a line scanner) can be provided.

The image processing section 16 is configured so that image data (image data scanned) outputted from the area CCD scanner 12 or the line CCD scanner 14 is inputted thereto, and image data obtained by digital camera photography, image data obtained by reading documents other than film images (for example, a reflecting document or the like), image data created by a computer, or the like (hereinafter, these data are all referred to as file image data) are inputted from external portions (for example, data is inputted via a storage medium such as a memory card or the like, or data is inputted from other information processing devices via a communication line or the like).

The image processing section 16 executes various image processings such as correction and the like for image data inputted, and outputs the inputted image data to the laser printer section 18 to be printed. Further, the image processing section 16 outputs image data from which image processing has been effected (for example, data is outputted to a storage medium such as a memory card or the like, data is transmitted to another information processing devices via a communication line, or the like).

The laser printer section 18 comprises a laser (light) source which is formed by R, G, B. The modulated laser light is irradiated onto printing paper in accordance with image data which is supposed to be recorded, inputted from the image processing section 16, and the image inputted is recorded on printing paper through scanning/exposure. Further, in the processor section 20, each of the processings such as color developing, bleaching/fixing, washing, and drying is effected on printing paper on which images have been formed through scanning/exposure in the laser printer section 18.

Next, a description of the structure of the image processing section 16 relating to the present invention is given with reference to FIG. 2. An area scanner correction section 120 corresponding to the area CCD scanner 12, and a line scanner correction section 122 corresponding to the line CCD scanner 14 are provided in the image processing section 16.

The area scanner correction section 120 is provided with a dark correction circuit 124, a defective pixel correction section 128, and a bright correction circuit 130. The dark correction circuit 124 stores image data inputted from the area CCD scanner 12 for each pixel in a state in which the area CCD is shielded by a shutter on the light irradiated side thereof (data representing dark outputting level of the area CCD) and corrects image data by reducing the dark outputting level for each pixel on the basis of the image data scanned, which is inputted from the area CCD scanner 12.

Further, photoelectric transfer characteristics of the area CCD may vary for each CCD cell unit. In the bright correction circuit 130 which is provided downstream of the defective pixel correction section 128, a film image which is used for adjustment and whose entire image screen has a fixed density is set at the area CCD scanner 12 and is read by the area CCD. Image data for the film image for adjustment is inputted from the area CCD scanner 12. On the basis of the inputted image data for the film image for adjustment, gains are determined for each pixel (variations of density for each pixel are caused by those of photoelectric transfer characteristics inherent in each CCD cell). In this way, the bright correction circuit 130 corrects image data to be read which is inputted from the area CCD scanner 12, for each pixel.

On the other hand, in image data of the film image for adjustment, when some specified pixels are largely different from others in their densities, the CCD cells corresponding to the specified pixels are abnormal in some points, and accordingly, the specified pixels can be judged to be defective pixels. The defective pixel correction section 128 operates in such a way that it stores addresses of the defective pixels on the basis of image data for adjustment of the film image, and interpolates data for the defective pixels among image data to be read of the film image which is inputted from the area CCD scanner 12 with data for surrounding pixels.

The line scanner correction section 122 has three signal processing systems including the aforementioned dark correction circuit 124, the defective pixel correction section 128, and the bright correction circuit 130, and it processes image data comprising R, G, B which are outputted in parallel from the line CCD scanner 14. Further, in the line CCD, three lines (a row of CCD cells) are sequentially disposed so as to be spaced apart from each other at a predetermined distance along the transport direction of a photographic film. Accordingly, the timing at which image data for each of the component colors R, G, and B is outputted from the line CCD scanner 14 differs. The line scanner correction section 122 delays the output timing of image data with different timing for each of the component colors R, G, and B in such a way that R, G, and B image data having the same pixels are outputted concurrently on the film image.

The output ends of the area scanner correction section 120 and the line scanner correction section 122 are connected to the input end of the selector 132. Image data outputted from the correction sections 120 and 122 are inputted to the selector 132. The input end of the selector 132 is also connected to the data output end of the I/O controller 134. File image data inputted from the external portion is inputted to the selector 132. The output end of the selector 132 is connected to the data input ends of the I/O controller 134 and image processor sections 136A and 136B, respectively. The selector 132 can selectively output the image data inputted to each of the I/O controller 134, and the input image processor sections 136A and 136B.

The image processor section 136A includes a memory controller 138, an image processor 140, and three frame memories 142A, 142B, and 142C. Each of the frame memories 142A, 142B and 142C has a storage capacity which can store image data of a single film image, and image data inputted from the selector 132 is stored in any one of three frame memories 142. However, the memory controller 138 controls addresses which are used when image data is stored in the frame memories 142 so that data for each pixel of the inputted image data is stored in parallel in a fixed order in the storage area of each of the frame memories 142.

The image processor 140 fetches image data stored in the frame memory 142, and executes various types of image processings including gradation conversion, color conversion, and hyper tone processing by which the gradation of super low frequency bright components of an image are compressed, hyper sharpness processing by which the sharpness of an image is emphasized while image graininess is controlled, or the like. Further, processing conditions of the above-described image processing are automatically computed by an auto set-up engine 144 (which will be described later). An image processing is effected depending on the computed processing conditions. The image processor 140 is connected to the I/O controller 134, and image data for which image processing has been completed is temporarily stored in the frame memory 142, and is thereafter outputted to the I/O controller 134 at a predetermined timing. Moreover, because the image processor section 136B is structured in the same manner as the aforementioned image processor section 136A, a description thereof will be omitted.

In the present embodiment, data is read twice in the area CCD scanner 12 or the line CCD scanner 14, for each film image. In the first reading (hereinafter, it is referred to as a prescanning), when the film image has an extremely low density (for example, an overexposed negative image on a negative film), the reading of the film image is executed under the reading conditions which have been determined such that the area CCD 42 or the line CCD 116 is not saturated with accumulated charges. Image data which is obtained through the prescanning (prescanned image data) is inputted from the selector 132 to the I/O controller 134, and is further outputted to the auto set-up engine 144 which is connected to the I/O controller 134.

The auto set-up engine 144 is structured so that it comprises CPU 146, RAM 148 (for example, DRAM), ROM (for example, ROM in which the storage contents can be rewritten), and I/O port 152, which are connected to each other via a bus 154.

On the basis of the prescanned image data of the film image, which is equal to a plurality of frames which are inputted from the I/O controller 134, the auto set-up engine 144 computes processing conditions of image processing for image data which is obtained by fine scanning (fine scanned image data), and it outputs the computed processing conditions to the image processor 140 of the image processor section 136. In a computation of processing conditions in image processing, it is determined whether there are a plurality of film images in which similar scenes have been photographed on the basis of the exposure amount at the time of filming, the type of photographic light source, or other characteristics. When there are a plurality of film images in which a plurality of similar scenes have been photographed, image processing conditions for fine scanned image data of these film images are determined to be approximate or the same as each other.

Further, the optimum conditions for image processing may vary depending upon whether image data for which image processing has been completed is used for recording an image on printing paper in the laser printing section 18, whether it is outputted to the external portion, or the like. Since the image processing section 16 has two image processor sections 136A and 136B, for example, if image data is used for recording an image on printing paper, and it is outputted to the external portion, the auto set-up engine 144 computes the optimum processing conditions in accordance with respective purposes, and outputs the computed conditions to the image processor sections 136A and 136B. Accordingly, in the image processor sections 136A and 136B, image processing is executed under different processing conditions for the same fine scanned image data.

Further, on the basis of the prescanned image data which has been inputted from the I/O controller 134, the auto set-up engine 144 computes image recording parameters which define gray balance, for example, when an image is recorded on printing paper with the laser printer section 18, and outputs the computed parameters at the same time that image data to be recorded (which will be described later) is outputted to the laser printer section 18.

The I/O controller 134 is connected to the laser printer section 18 via an I/F circuit 156. When image data for which image processing has been completed is used for recording an image on printing paper, image data for which image processing has been executed at the image processor section 136 is outputted from the I/O controller 134 via an I/F circuit 156 to the laser printer section 18 as image data for recording. Further, the auto set-up engine 144 is connected to the personal computer 158. When image data for which image processing has been completed is outputted to the external portion as an image file, image data for which image processing has been effected in the image processor section 136 is outputted to the personal computer 158 from the I/O controller 134 via the auto set-up engine 144.

The personal computer 158 comprises a CPU 160, a memory 162, a display 164, a key board 166, a hard disk 168, a CD-ROM driver 170, a transport control section 172, an expansion slot 174, an image compression/expansion section 176 and a communication control section 175, which are connected to each other via a bus 178. The transport control section 172 is connected to a film carrier 38, and it controls the transport of photographic film by the film carrier 38. Further, when an APS film is set on the film carrier 38, the information which is read by the film carrier 38 from a magnetic layer of the APS film (for example, image recording size or the like) is inputted. A communication wire 177 is connected to the communication control section 175, and it is structured so that e-mail can be sent from the personal computer 158 to the external information processing device (i.e., a personal computer or the like which is installed at a station where a service man is standing by.)

A driver (not shown) which reads/writes data for a storage medium such as a memory card or the like and a communication controller which communicates with another information processing device are connected to the personal computer 158 via the expansion slot 174. When image data to be outputted from the I/O controller 134 to the external portion is inputted, the image data is outputted to the external portion (the aforementioned driver, the communication controller or the like) as an image file, via the expansion slot 174. Further, when the file image data is inputted from the external portion via the expansion slot 174, the inputted file image data is outputted to the I/O controller 134 via the auto set-up engine 144. In this case, the I/O controller 134 outputs the inputted file image data to the selector 132.

The image processing section 16 outputs the prescanned image data or the like to the personal computer 158, displays the film image which is read by the area CCD scanner 12 and the line CCD scanner 14 on the display 164, and displays the assumed image which may be obtained by recording the film image onto printing paper. When modifications or the like of the image are instructed by an operator via the key board 166, the instructions can be reflected on the image processing conditions.

As will be described later, the image processing section 16 according to the present embodiment has a self judgment function and a switching function. The self judgment function judges whether the image processing is executed normally by the image processor 140. The switching function terminates image processing by the image processor 140, and automatically switches image processing so as to be effected by an auto set-up engine 144 when the image processing using the image processor 140 is judged to be abnormal. For this reason, in the image processing section 16, as shown in FIG. 3, ordinarily, image processing (hardware processing shown in FIG. 3) is effected by the image processor 140 which is made as an exclusive processor for carrying out image processing. However, when image processing by the image processor 140 is judged to be abnormal due to a failure or the like, image processing is automatically switched by the auto-set-up engine 144 so that the emulation which is a similar processing to the image processing of the image processor 140 is executed.

As will be described later, the auto set-up engine 144 according to the present embodiment has a memory judging function, a switching function, and a processable size reporting. The memory judging function judges whether each of the frame memories 142A, 142B, and 142C is normal. When at least one of the frame memories is abnormal, the switching function switches the current image processing to another image processing by using the remaining normal frame memories. When at least one of the frame memories is judged to be abnormal, the user/operator is informed of image sizes which can be processed on the basis of the number of frame memories which are normal at this time through the processable size reporting means.

FIG. 4 shows the flow of image data for the image processing which is executed in the image processor section 136. As shown in FIG. 4, in the image processor section 136, image processing is executed in the following three steps. Further, as described above, the memory controller 138 of the image processor section 136 controls storage addresses which are involved when image data is stored in the frame memory 142. Accordingly, in FIG. 4, the memory controller 138 is drawn on both sides of the frame memories 142, where image data is input or output.

In the image processor section 136, image data which is transmitted from the selector 132 of FIG. 2 is read by any one of the frame memories 142 (step A: reading of image data). Next, image data is read from the frame memory 142, and image processing by the image processor 140 is executed, and image data for which image processing has been completed is rewritten in the frame memory 142 (step B: image processing). Thereafter, image data for which image processing has been executed is read from the frame memory 142 and outputted (step C: outputting of image data).

When such image processing is executed at the image processor section 136, as shown in FIG. 5A, ordinarily, all of the three frame memories are used to effect the aforementioned three steps concurrently, repeatedly and sequentially. For example, at time $t_1$, the frame memory 142A is used to start implementing step A. At time $t_2$, the frame memory 142A is used to start implementing step B, and the frame memory 142B is used to start implementing step A. At time of $t_3$, the frame memory 142A is used to start implementing step C, the frame memory 142B is used to start implementing step B, and the frame memory 142C is used to start implementing step A. In this way, image processing is implemented by changing steps per time period T with each frame memory.

In this state, for example, when the frame memory 142A is judged to be abnormal, as shown in FIG. 5B, the auto set-up engine 144 automatically switches the current image processing to another image processing at the image processor section 136. Namely, the auto set-up engine 144 switches the processing at the image processor section 136 so that three steps are effected sequentially and repeatedly, while a concurrent processing is applied to two steps by using the remaining normal frame memories 142B and 142C.

A description of operation according to the present embodiment in which the aforementioned self judgment and switching functions are processed will be given hereinafter.

FIG. 6 shows a self judgment process in the image processing section 16. The CPU 146 of the auto set-up engine 144 starts the self judgment process when an operator instructs it to carry out this self judgment process through a keyboard, or when it is set to work periodically at a predetermined time (for example, at starting up time every morning).

In Step 202 in FIG. 6, the CPU 160 of the personal computer 158 must read from the hard disk 168 the original test pattern image data having an outputted image obtained by the image processor executing normal image processing (hereinafter, it is simply referred to as the original image data). The original image data is sent from the hard disk 168 to the image processor 140 via the bus 178, the I/O port 152, the I/O controller 134, the selector 132, and the memory controller 138. In Step 204, image processing for the original image data is implemented.

In Step 206, the outputted image from the image processor 140 is fetched via the I/O controller 134, the I/O port 152, and the bus 154, and the outputted image and the original image are compared to each other.

In accordance with the results of the comparison, when the image outputted from the image processor 140 and the original image are the same, the image processing by the image processor 140 can be judged to be normal. Accordingly, the routine proceeds to Step 214, where the operator is given information to this effect on the display 164 of the personal computer 158. In this case, image processing is continued by the image processor 140 at high speed.

On the other hand, in Step 208, when the outputted image from the image processor 140 and the original image are different, the image processing by the image processor 140 is judged to be abnormal. Accordingly, the routine proceeds to Step 210, where the current image processing using the image processor 140 is suspended, and is switched so as to emulate the image processing using the auto set-up engine 144.

Thereafter, the CPU 146 of the auto set-up engine 144 temporarily stores in RAM 148, image data which is transmitted via the selector 132, the I/O controller 134, the I/O port 152, and the bus 154, reads from ROM 150, a program having the same processing contents as the image processing using the image processor 140 so that the image processing for the image data which has been temporarily stored is emulated. The processing rate of emulation of the image processing is lower than that of the image processing using the image processor 140. However, it is possible to continue image processing for image data.

Further, in Step 212, the operator is informed by the display 164 of the PC 158 that the image processing using the image processor 140 is abnormal and the current image processing has been switched to emulation of the image processing by the auto set-up engine 144.

By using such processings as described above, even when the image processor 140 is abnormal and the current image processing using the image processor 140 cannot be executed correctly, it is possible to detect quickly whether the image processing is abnormal by a judging using the aforementioned test pattern and to switch the current image processing so as to be emulated by the auto set-up engine 144. Thus, even when the image processor 140 is out of order, image processing can be continued free of trouble until the image processor 140 is replaced.

Moreover, when the image processing by the image processor 140 is judged to be abnormal, because the operator is immediately informed that image processing in the image processor 140 is abnormal, the operator can recognize it quickly and handle the problem by preparing another image processor 140, or the like.

Further, after a new image processor has been replaced by a service man or an operators, a confirmation process which is shown in FIG. 7 is executed by the CPU 146 of the auto set-up engine 144.

In Steps 202 to 208 in FIG. 7, in the same manner as the self judgment process in FIG. 6, the original image data is outputted to the new image processor 140. An image processing is executed for the original image data using the image processor 140. The outputted image and the original image are compared to each other.

By this comparison, when the outputted image from the new image processor 140 and the original image are the same, since the image processing using the new image processor 140 can be judged to be normal, the routine proceeds to Step 215, where emulation of image processing which until this stage has been effected temporarily by the auto set-up engine 144 is suspended, and the image processing is switched so as to be executed by using the new image processor 140. In Step 217, the operator is informed by the display 164 of the PC 158 that the image processor 140 in Step 215 is judged to be normal.

On the other hand, when the outputted image from the new image processor 140 and the original image are different, the image processing using the new image processor 140 can be judged to be abnormal. Accordingly, the routine proceeds to Step 211, where the operator is informed that the image processing by the new image processor 140 is abnormal, and a second image processor 140 switch is demanded. Therefore, the operator can immediately recognize that the image processor 140 is abnormal, and thereby promptly switch the image processor 140 for another image processor 140.

Further, in the above-described embodiment, an example in which the image processing is emulated by the auto set-up engine 144 when the image processor 140 fails has been explained. However, instead of the auto set-up engine 144, a personal computer 158 can emulate the image processing so that effects similar to those brought about by the auto set-up engine 144 can be obtained.

Moreover, in the above described embodiment, an example in which the self judgment process in FIG. 6 and the confirmation process after the switching of image processor in FIG. 7 are executed by the CPU 146 of the auto set-up engine 144 has been explained, but they can be executed by CPU 160 of the personal computer 158.

Further, in the present embodiment, an example in which the above-described information about whether the image processor 140 is normal, and when it is abnormal, image processing by the same processor 140 is emulated by the auto set-up engine 144 is given to the operator on the display 164. However, it can be written on paper or spoken from an unillustrated speaker mounted on the PC 158.

Figure 8A:
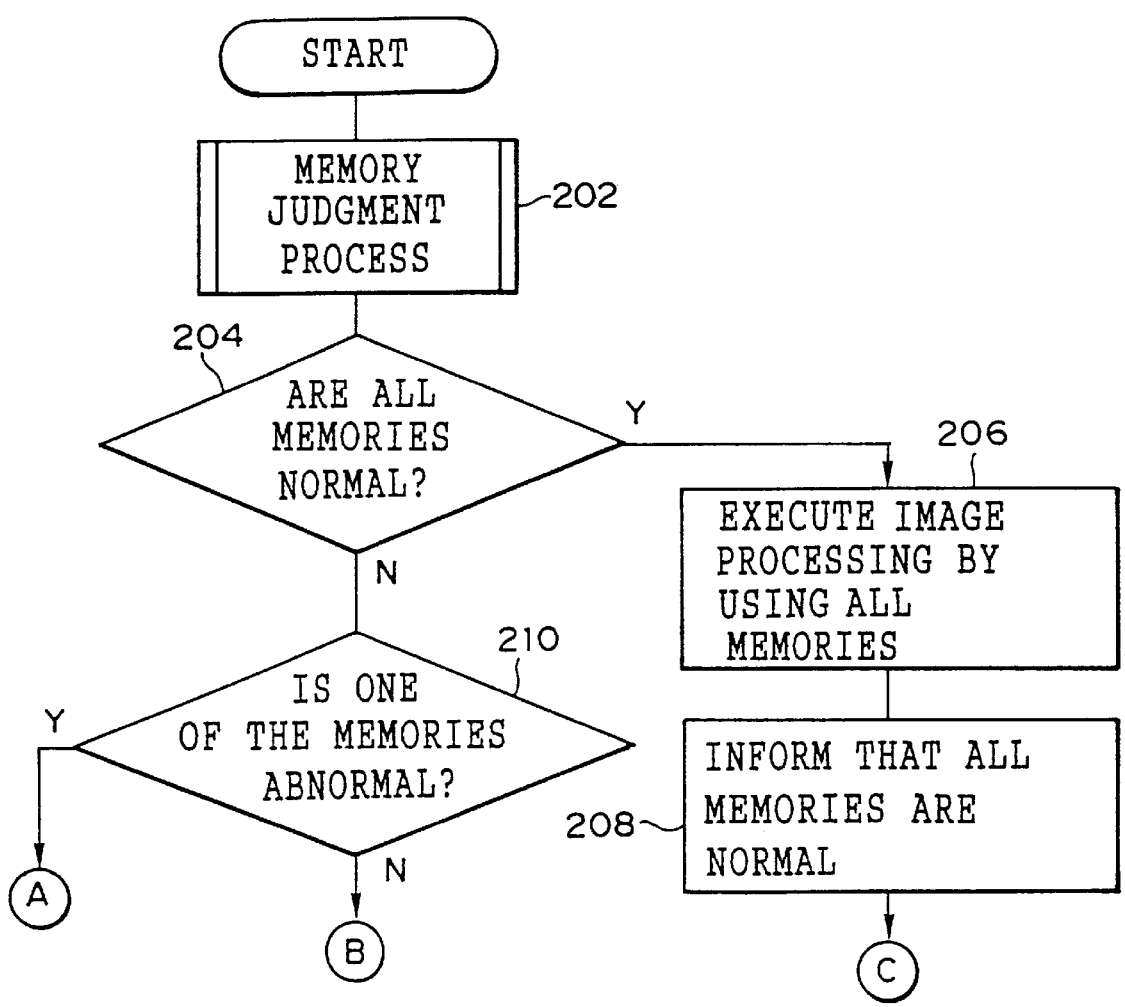
FIG. 8A is a flow chart which illustrates a control routine of a memory judgment process and an image processing control process according to the present embodiment.
Figure 8B:
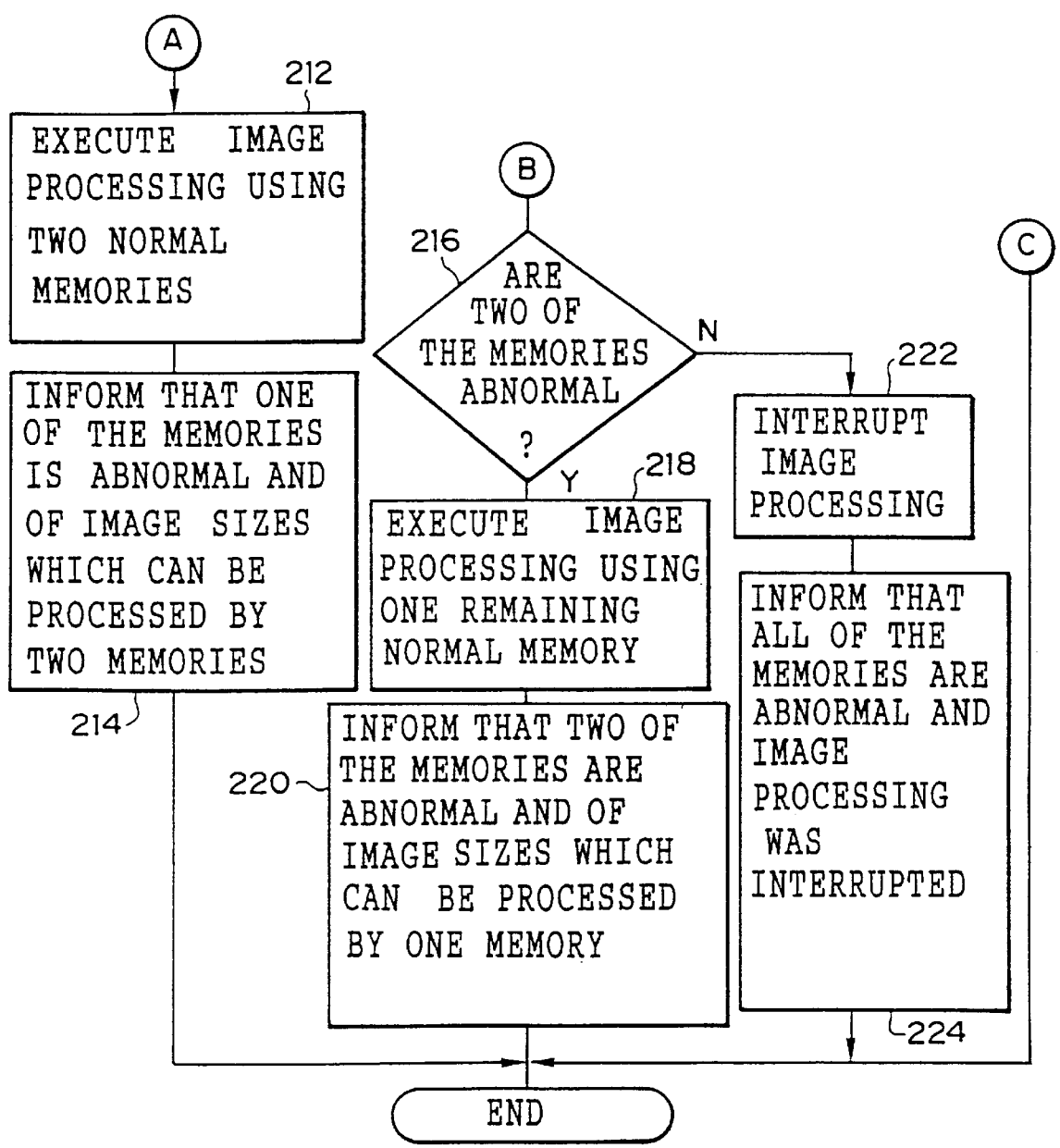
FIG. 8B is a flow chart which illustrates the control routine of the memory judgment process and the image processing control process according to the present embodiment.

In the auto set-up engine 144 according to the present embodiment, the memory judging process and the image processing control process, shown in FIGS. 8A and 8B, are executed by the CPU 146 when instructed by the operator through the keyboard 166, or when executed periodically at a predetermined time (for example, at start-up time every morning). Further, in the present embodiment, as an example, the memory size of each frame memory 142 is 4000 pixels×2000 pixels and the picture element density is 300 dpi (dot/inch).

Figure 9:
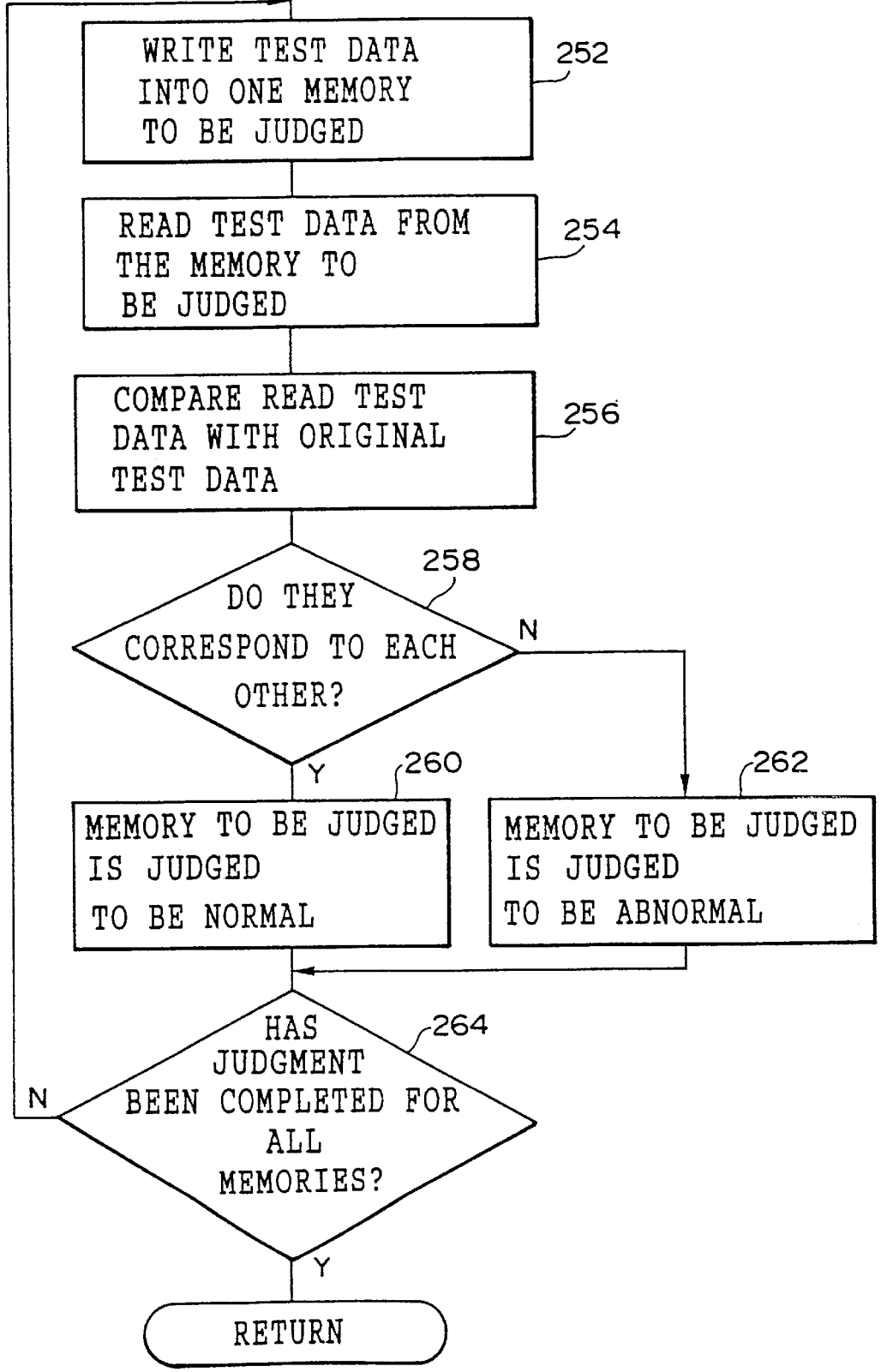
FIG. 9 is a flowchart which illustrates a subroutine of the memory judgment process.

In Step 202 in FIG. 8A and 8B, a sub routine of the memory judging process in FIG. 9 is effected. In Step 252 in FIG. 9, CPU 160 of the PC 158 is directed to read image data from the hard disk 168. This test data is transmitted to the image processor section 136 via a bus 178, the I/O port 152, the I/O controller 134, and the selector 132. In the image processor section 136, the test data is written into one frame memory which is supposed to be judged among frame memories 142A, 142B, and 142C. At the same time, test data is transmitted from the hard disk 168 to the CPU 146 via the bus 178, the I/O port 152, and the bus 154.

In Step 254, the written test data is read from the frame memory which is to be judged, and is transmitted to the CPU 146 via the I/O controller 134, the I/O port 152, and the bus 178. In Step 256, the read test data and the original test data are compared to each other.

By this comparison, when both data correspond to each other, in Step 260, the frame memory to be judged is judged to be normal. When both data do not correspond to each other, in Step 262, the frame memory to be judged is judged to be abnormal.

In this way, through Steps 252 to 262 in FIG. 9, it is judged whether one frame memory to be judged is normal. Steps 252 to 262 are repeated for the other frame memories in order to diagnose whether each frame memory is normal.

After Steps 252 to 262 have been implemented for all the frame memories, the routine returns to the main routine in FIGS. 8A and 8B.

In the main routine in FIGS. 8A and 8B, in Step 204, on the basis of the results from the memory judging process in Step 202, it is judged whether all of the three frame memories 142A, 142B, and 142C are normal. When all of the three frame memories 142A, 142B, and 142C are normal, the routine proceeds to Step 206. In Step 206, as shown in FIG. 5A, all of the three frame memories 142A, 142B, and 142C are used to control the image processor section 136 to carry out the above-described three steps (step A: reading of image data, step B: image processing, and step C: outputting (printing) of image data), sequentially and repeatedly.

Accordingly, in the image processor section 136, for example, as shown in FIG. 5A, at time $t_1$, the frame memory 142A is used to start step A, at time $t_2$, the frame memory 142A is used to start step B, and the frame memory 142B is used to start step A, respectively. Further, at time $t_3$, the frame memory 142A is used to start step C, the frame memory 142B is used to start step B, and the frame memory 142C is used to start step A, respectively. Thus, an image processing is implemented by changing steps at each frame memory for each period of time T. In addition, when all three frame memories 142A, 142B and 142C are normal, they can be processed for all image sizes in general use.

In Step 208, information that all of the frame memories 142A, 142B and 142C are normal and information of all of the processable image sizes is displayed on the display 164 of the PC 158.

On the other hand, when at least one of the frame memories is abnormal, the judgment in Step 204 is negative. The routine proceeds to Step 210, where it is judged whether one of the three frame memories 142A, 142B and 142C is abnormal. When one frame memory is abnormal, the routine proceeds to Step 212 (see FIG. 8B). In Step 212, as shown in FIG. 5B, the image processing at the image processor section 136 is switched such that three steps are implemented sequentially and repeatedly while two steps are being processed concurrently by using the other two normal frame memories.

Accordingly, at the image processor section 136, for example, as shown in FIG. 5B, at time $t_1$, the frame memory 142B is used to start step A. At time $t_2$, the frame memory 142B is used to start step B, and the frame memory 142C is used to start step A. At time $t_3$, the frame memory 142B is used to start step C, and the frame memory 142C is used to start step B. Thus, an image processing is implemented by changing steps for each period of time T.

In Step 214, two frame memories are used to read the information about image sizes which can be processed, from hard disk 168. The information that one frame memory is abnormal, and image sizes which can be processed by two memories (in this case, image sizes except for a "wide" quarter size (4500 pixels×3000 pixels)) is transmitted to the operator through the display 164. Further, a message having the same information that one memory is abnormal is transmitted to a service man by e-mail via a communication line 177 from the communication control section 175 of the PC 158.

On the other hand, when two frame memories or more are abnormal, the judgment in Step 210 is negative. The routine proceeds to Step 216, where it is judged whether two frame memories among three frame memories 142A, 142B, and 142C are abnormal. When two frame memories are abnormal, the routine proceeds to Step 218, where the image processing at the image processor section 136 is switched such that the remaining one normal frame memory is used to carry out an image processing comprising three steps Step by step sequentially and repeatedly.

In Step 220, information about image sizes which can be processed by one frame memory is read from the hard disk 168. Accordingly, information that two frame memories are abnormal, and image sizes which can be processed by one frame memory (e.g., image sizes except for a "wide" quarter size (4500 pixels×3000 pixels) and a quarter size (3600 pixels×3000 pixels)) is transmitted to the operator through the display 164. Further, a message that two frame memories are abnormal is sent to a service man by e-mail from the communication control section 175 via the communication line 177.

When all of the frame memories are abnormal, because image processing cannot be implemented, the routine is forwarded to Step 222, where the image processor section 136 is used to suspend the image processing. In Step 224, information that all of the frame memories are abnormal and the image processing is suspended is transmitted to the operator through the display 164. Also, a message that all of the three frame memories are abnormal is sent to a service man by e-mail from the communication control section 175 via the communication line 177.

Because image processing is effected in this manner, when at least one of the three frame memories is out of order, image processing can be continued by using the remaining normal memory/memories.

Further, when a frame memory is out of order, information that a frame memory is out of order and of the image sizes which can be processed in accordance with the number of the remaining normal frame memories is immediately transmitted to the operator. The operator can easily see that failure has occurred to a frame memory and continue image processing within a specified range of image sizes which can be processed.

Further, because a message that a frame memory is abnormal is sent to a service man by e-mail via the communication line 177, the service man can quickly recognize the failure of a frame memory, and prepare another frame memory promptly.

In the above-description, an example in which three frame memories are provided at the image processing section 16 has been described. However, two frame memories, or four frame memories or more, may be provided, and similar effects to the present embodiment can be obtained.

In the above-description, an example has been explained in which the image processings which are shown in FIG. 8A and 8B, and FIG. 9 are executed by the CPU 146 of the auto set-up engine 144. However, CPU 160 of the PC 158 can be used.

As described above, in accordance with a first aspect of the present invention, when image processing by the image processor has been judge to be abnormal, the image processing of the image processor is immediately switched with software so as to effect the same image processing. Although the processing rate may deteriorate, image processing can be continued until another image processor is prepared.

In accordance with a second aspect of the present invention, the judging means judges whether the image processing executed by the image processor is normal by comparing an outputted image obtained by the image processor executing the image processing and an outputted image obtained by the image processor executing normal image processing. As a result, a correct judging can be effected.

In accordance with a third aspect of the present invention, even when at least one of the memories is out of order, because image processing can be effected by the memory/memories which is judged to be normal, image processing can be continued without being interrupted.

In accordance with a fourth aspect of the present invention, even when one of three memories is out of order, the three processes can still be executed concurrently, sequentially and repeatedly by the other two memories. As a result, even when any one of the memories is out of order, image processing can be continued without being interrupted.

What is claimed is:

1. An image processing device, comprising:

a plurality of distinct image frame memories operatively connected to a single image processor for effecting image processing by the image processor by concurrently and repeatedly executing reading, image processing and outputting functions for input image data; and a control device external to said single image processor for writing original test data to, and reading image data written from each of said memories, wherein said control device compares said original written test data with said read image data written from said memories to determine whether each of said memories is operating in a normal manner, wherein, if at least one of said memories is judged abnormal due to the disagreement in the compared data, said control device switches said reading, image processing and outputting functions previously performed by said now abnormal memory to the remaining memories which concurrently execute the functions in order to effect image processing by the image processor, and wherein said control device transmits information of the abnormal memory to an operator, and informs the operator of possible image sizes which can still be processed by said remaining memories.

2. The device of claim 1, wherein said plurality of memories consist of three frame memories, and wherein, if two of said three frame memories are judged abnormal due to the disagreement in the compared data, said control device switches said reading, writing and outputting functions performed by said now abnormal two frame memories to the remaining frame memory.

3. The device of claim 2, wherein said control device transmits information of the abnormal two frame memories to an operator, and informs the operator of possible image sizes which can still be processed by said remaining frame memory.

* * * * *